United States Patent [19]

Bustin et al.

[11] 4,408,970
[45] Oct. 11, 1983

[54] STABILIZING AIR RING APPARATUS

[75] Inventors: Franz Bustin, Rochester; Charles K. Bloomer, Newark, both of N.Y.

[73] Assignee: Mobil Oil Corporation, New York, N.Y.

[21] Appl. No.: 284,862

[22] Filed: Jul. 20, 1981

Related U.S. Application Data

[63] Continuation of Ser. No. 105,350, Dec. 19, 1979, abandoned.

[51] Int. Cl.³ ............................................. B29D 7/22
[52] U.S. Cl. .................................... 425/72 R; 264/566; 264/569; 425/326.1; 425/384; 425/392; 425/445
[58] Field of Search ................. 425/72 R, 326.1, 384, 425/392, 445; 264/564–567, 569

[56] References Cited

U.S. PATENT DOCUMENTS

| | | | |
|---|---|---|---|
| 3,218,380 | 11/1965 | Euling et al. | 425/326.1 |
| 3,555,604 | 1/1971 | Pahlke | 425/72 R |
| 3,852,392 | 12/1974 | Davis et al. | 425/326.1 |
| 3,930,781 | 1/1976 | Upmeier | 425/326.1 |
| 3,950,466 | 4/1976 | Hasler | 425/326.1 |
| 3,958,913 | 5/1976 | Stangl | 425/445 |
| 3,980,418 | 9/1976 | Schott, Jr. | 425/72 R |
| 4,189,288 | 2/1980 | Halter | 425/72 R |

FOREIGN PATENT DOCUMENTS

| | | | |
|---|---|---|---|
| 2447694 | 4/1976 | Fed. Rep. of Germany | 425/72 R |
| 46-20591 | 6/1971 | Japan | 264/565 |
| 621583 | 8/1978 | U.S.S.R. | 264/565 |

Primary Examiner—Jeffery R. Thurlow
Attorney, Agent, or Firm—C. A. Huggett; M. G. Gilman; J. F. Powers, Jr.

[57] ABSTRACT

The present invention relates to a method and apparatus for the extrusion of thermoplastic film which comprises extruding a melt of thermoplastic through an annular orifice to form a bubble or tube and while the tube is still in a semi-molten condition, passing the tube through a cooling and stabilizing means which surrounds the tube and is characterized by having a variable diameter to accommodate varying sizes of tubing.

7 Claims, 6 Drawing Figures

STABILIZING AIR RING APPARATUS

This is a continuation of application Ser. No. 105,350, filed Dec. 19, 1979 and now abandoned.

BACKGROUND OF THE INVENTION

1. Field of the Invention

The present invention relates to an apparatus and method for producing blown tubular films from thermoplastic resinous materials. More particularly, this invention relates to improved tube forming and cooling procedures wherein a blown tube is formed by the entrapped bubble method and is cooled and stabilized by an adjustable stabilizer air ring as it is being advanced to further processing.

2. Description of the Prior Art

Generally, the prior art techniques for forming tubular thermoplastic films comprise continuously extruding a melt of a thermoplastic material through an annular orifice, applying internal air pressure to the tube thus formed and shape expanding the tube and reducing the wall thickness thereof to appropriate dimensions while cooling and solidifying the extruded thermoplastic. Thereafter, the formed tubing is collapsed by passing it through the nip formed by a pair of counter-rotating pinch rolls. The flattened tubing may be subsequently passed to a wind up station or on to further processing such as bag-making operations for example.

Although useful tubing has been commercially prepared utilizing this method, when production rates are increased, i.e. when faster rates of tubular advancement are desired, there is a tendency for the advancing bubble before it is collapsed, to becme unstable and begin to flutter while the tube is till in a semi-motion condition. This will result in bubble failure or rupture and cause an attendant shutdown of the production line. Accordingly, one of the major problems in this area is to rapidly cool the extrudate bubble of thermoplastic material in order to maintain optimally high production rates. Conventionally, this can be accomplished utilizing air rings which are positioned around the external circumference of the tube as it is being extruded. In general, such air rings comprise a circular orifice through which air is fed under pressure from a plenum chamber. The cooling air which is directed at the tube helps to solidify the molten polymer. Also in the past, to assist in maintaining bubble stability downstream from the cooling air ring, which air ring is usually positioned immediately adjacent to the tubular die, stabilizer rings, comprising a ring element through which the tube is passed, are positioned around the tube. These stabilizing rings, to some degree, reduce bubble instability at high production rates. Obviously, however, when it is desired to change the diameter of the extrudate tube to meet particular end use requirements, the extrusion line must be shutdown so that the stabilizer ring may be replaced with another ring having the desired diameter.

Applicant has now found that it is possible to combine the features of the stabilizing element with additional cooling means to achieve increased production efficiencies. Additionally applicant has devised an apparatus which may reamin in-line during change in the size of the extruded tubing thereby eliminating the necessity for line shutdowns required in the past.

SUMMARY OF THE INVENTION

The present invention comprises a method and apparatus which substantially reduces or eliminates the prior art difficulties attendant to the production of thermoplastic tubing at a relatively high rate of speed. As hereinbefore noted, such a high rate of speed tends to produce bubble instability and subsequent rupture or failure of the bubble. It is known that under a given set of operating conditions, increasing extrudate output necessarily results in the formation of the tube at higher rates. However, since the heat exchange character of the system will not have changed, it will also cause a rise in the height of the front line (that is the visible line where the extruded tube turns from a molten to a solid character). This in turn causes an increase in the instability of the extruded bubble because its unsupported molten length has become too long. The apparatus of the present invention provides the necessary additional cooling and peripheral support to maintain bubble stability at high speeds.

The adjustable stabilizing air ring of the present invention comprises a source of air which feeds air under pressure into a plenum chamber. The plenum chamber has a circular opening in the middle of it through which the extruded tube passes. Air outlet openings surround the inner-face of the air ring opening. The opening is provided with an adjustable iris diaphragm positioned at the bottom of the opening and another adjustable iris at the top of the opening which are interconnected whereby opening and closing of the upper iris diaphragm causes a proportionate opening or closing of the lower iris diaphragm so that at all times the opening in the upper and lower diaphragms are uniform. An adjustable tubular sleeve is also provided which sleeve is affixed to the inner periphery of the individual iris diaphragms whereby opening and closing of the diaphragms will impart an opening and closing motion to the adjustable tubular sleeve. An advancing thermoplastic tube, is passed through this adjustable channel member which cools and stabilizes the tube.

The stability of the advancing tube is improved since the tube runs along the inside surface of the adjustable sleeve and is cushioned by the flowing layer of air between the tube and the inner sleeve surface. The sleeve provides for a longer cooling period for the advancing tube by maintaining a mantle of cold air which surrounds the tube over a longer period when compared to the prior art stabilizer devices.

DESCRIPTION OF SPECIFIC EMBODIMENTS

Figure 1:
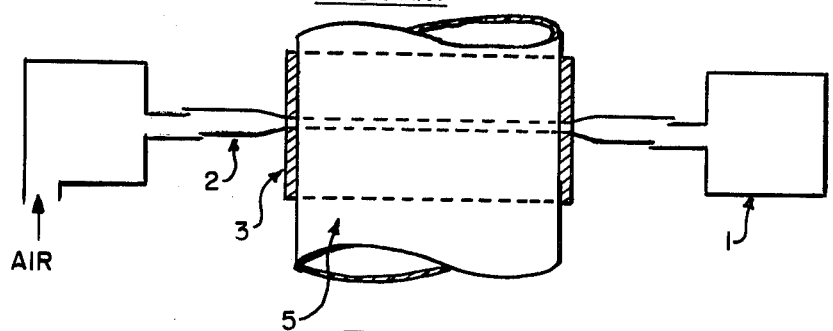
FIG. 1 is a side elevation view in cross-section of a prior art cooling-stabilizing ring.

FIG. 1 illustrates a prior art cooling and stabilizing device which is of the rigid or non-adjustable variety. As hereinbefore noted, when employed such devices in tubular extrusion, they must be continuously replaced whenever it is desired to increase or decrease the extruded tube diameter. The FIG. 1 prior art device comprises an air plenum 1 with an air ring insert 2. Rigidly mounted around the inner periphery of air ring 2 is a stabilizing extension 3. Extruded tubing 5 passes through stabilizing extension 3. It will be obvious that the tube must have a constant diameter since the diameter of stabilizing extension 3 is fixed. Accordingly in order to change the tube diameter, the production line must be shutdown while the prior art cooling and stabilizing device is replaced with one of a different diameter corresponding to the desired tube diameter.

Figure 2:
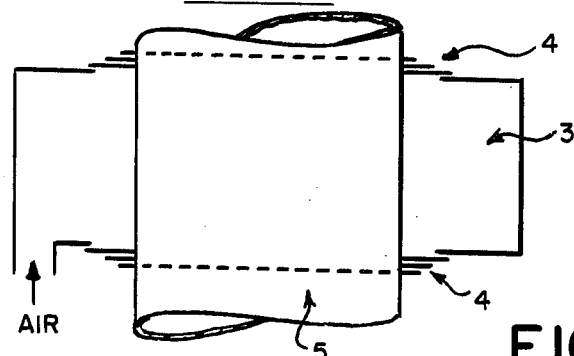
FIG. 2 is a side elevation view in cross-section of a prior art adjustable cooling-stabilizing apparatus.

FIG. 2 is a schematic illustration of a prior art adjustable cooling and stabilizing device which comprises a pair of upper and lower adjustable iris members which form the top and bottom walls of air chamber 3. As shown, air is forced under pressure into air chamber 3 and surrounds the advancing tube as it passes between lower and upper iris members 4. In such an arrangement, it will be noted that the air is not forced to stay against the surface of the advancing tube and accordingly the cooling efficiency of such an arrangement is vastly reduced. The adjustability feature is present, however, there is lacking an efficient means for keeping the cooling air in immediate contact with the advancing tube.

In accordance with the present invention, an apparatus has now been developed whereby both the features of adjustability as well as air cooling efficiency are present in a single apparatus.

Figure 3:
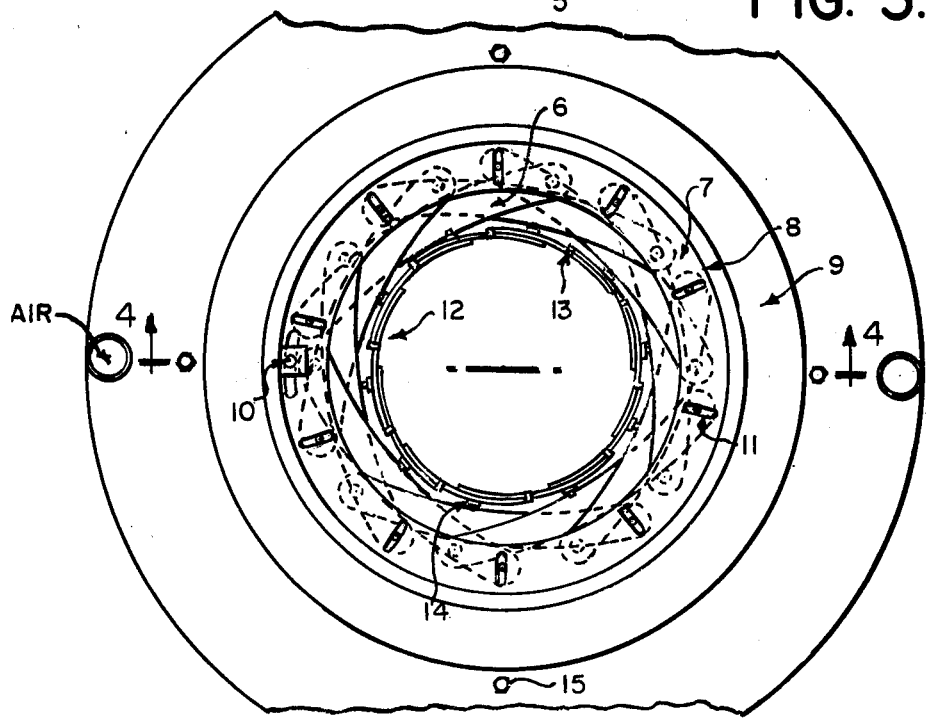
FIG. 3 is an overhead planar view of the adjustable cooling and stabilizing apparatus of the present invention.
Figure 6:
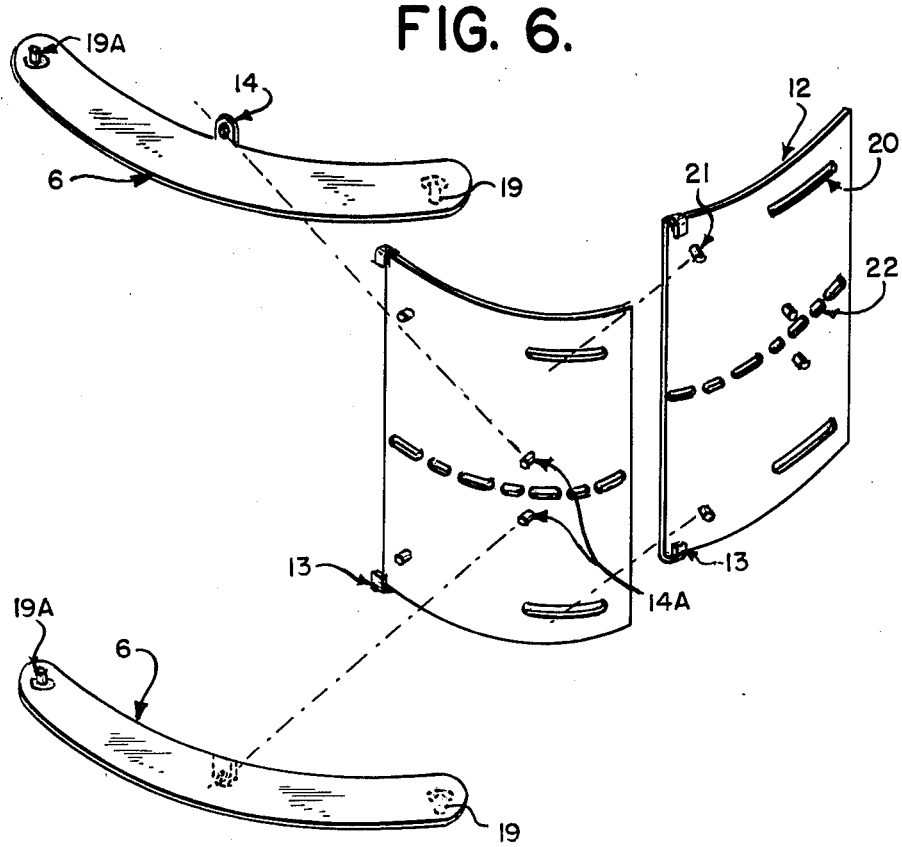
FIG. 6 is a detailed view, which has been disassembled away for clarity, of certain elements of the present apparatus which are illustrated in FIGS. 3 and 5.

As shown in FIG. 3, the adjustable stabilizing air ring of the present invention comprises iris segments 6 which are arcuate, flat pieces of sheet metal. A more detailed view of the individual iris segments is shown in FIG. 6. The bottom view (not shown) of the adjustable stabilizing air ring apparatus of the present invention is essentially identical to the top planar view shown in FIG. 3. There are two movable circular cover plates 7, more clearly shown in FIG. 4, which surround upper and lower iris elements 4. Stationary supporting plates 9 are provided for each one of the upper and the lower iris diaphragms. A more detailed view of stationary plates 9 can be seen in FIG. 4. Plates 9 form an interconnecting channel to plenum 1 to permit size adjustment of the upper and lower movable cover plates 7 and are connected with an adjustable handle 10 to ensure cover plates 7 move simultaneously in equal amounts of arc as adjustments are made. Adjustment handle 10, which passes through stationary plates 9, passes through slots which are provided to allow free movement of the handle. The iris segments 6, as shown in FIG. 6, are each provided with a pair of pins 19 and 19a pointing in opposite directions and located on the extremities of segments 6. Further, there is a tab 14 positioned in the center between pins 19 and 19a, which points upwards in the upper set of iris segments 6 and downwards in the lower set of iris segments 6. In FIG. 3 there are further shown slots 11 which are sliding surfaces for the pins 19 and 19a in the upper and lower iris assembly. The vertical segmented stabilizing extensions 12 are fastened to fastener tabs 14 provided on iris segments 6 as shown in FIG. 6. Further, there are clamping tabs 13 provided to prevent the adjustable assembly from unrolling.

Figure 4:
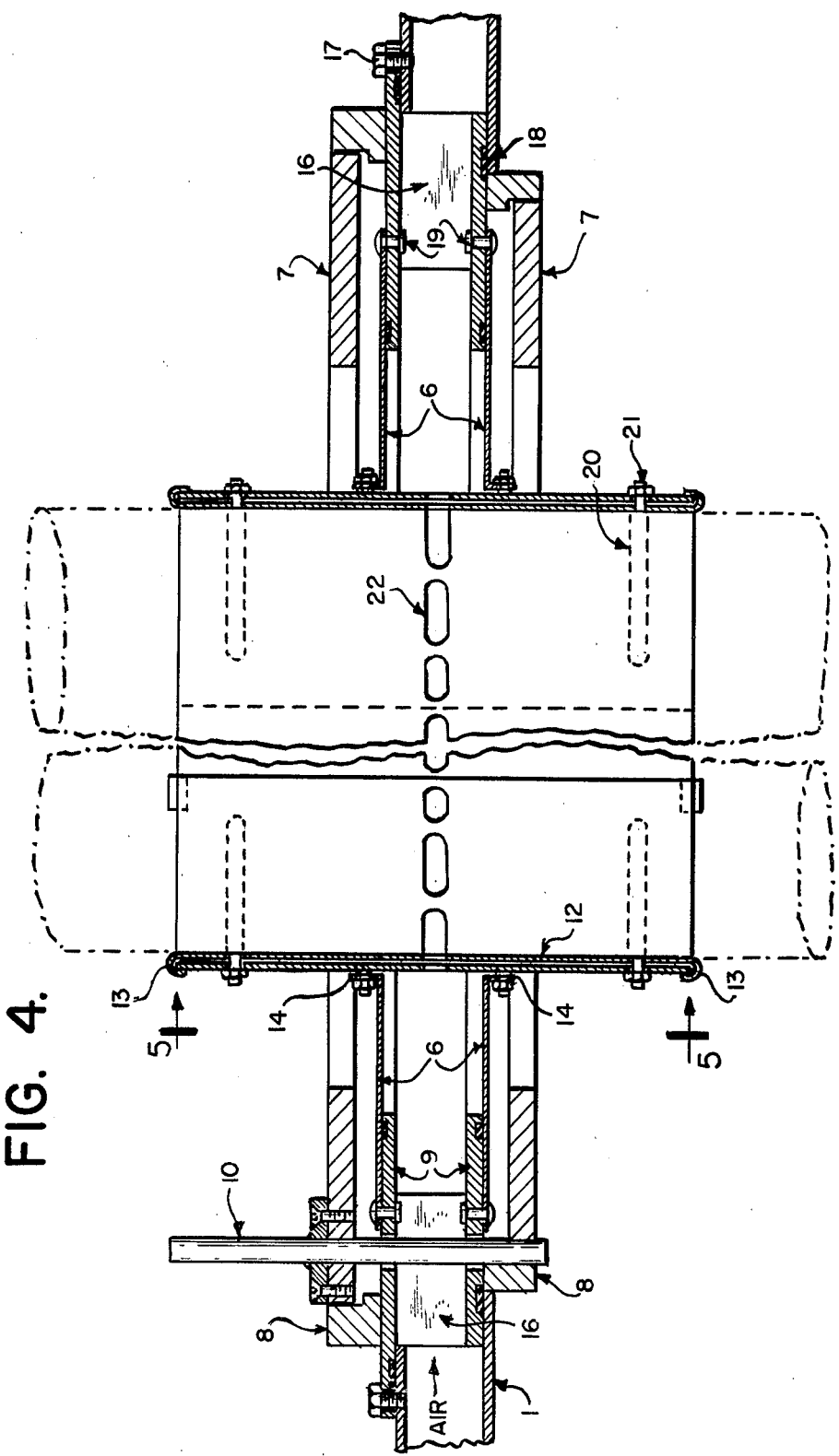
FIG. 4 is a side elevation view in cross-section taken on line 4—4 of FIG. 3.

As shown in FIG. 4, movable cover plates 9 ride on stationary rings 8. Cover plate 7 is a solid flat ring which moves within a second stationary ring 8. Cover plate 7 has a number of radial slots to accommodate segments 6 and which correspond in number to the number of iris elements 6 in the individual iris diaphragms. In the specific embodiment shown, that number is ten. Supporting plates 9 rest on plenum 1. handle 10 connects the upper movable cover plate 7 with lower movable plate 7. The segmented stabilizing extension or adjustable cooling and stabilizing sleeve 12 is provided with clamping tabs 13 to prevent unraveling of individual overlapping stabilizer extension plates. Fastener lugs 14 located on the individual iris segments 6 are provided to connect the vertical stabilizer extensions 12 to individual iris segments by fastener studs 14a. Spacer 16 is provided to ensure that supporting plates 9 are arranged so that a proper fit to plenum 1 is achieved. Bolts 15 hold the plenum cover in position. Bolts 17 fasten the stabilizer assembly to plenum 1. Gasket 18 is provided to prevent air leakage between iris 1 and supporting plates 9.

Figure 5:
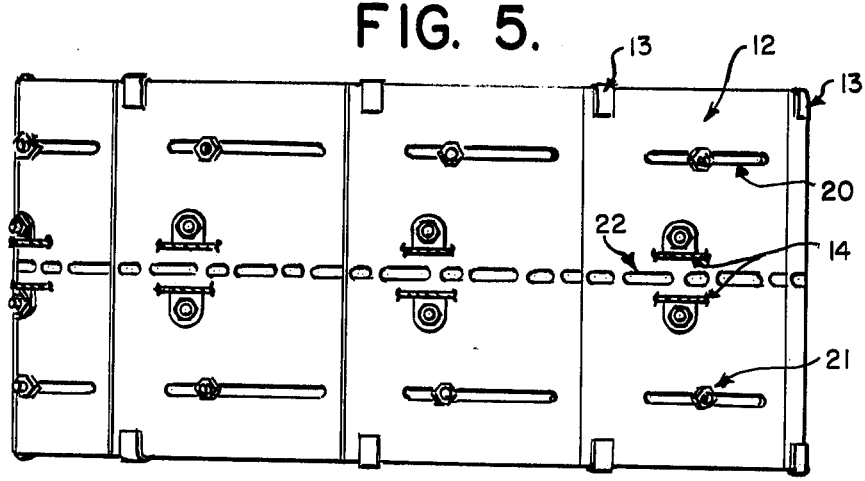
FIG. 5 is a side elevation view in cross-section of the cooling sleeve shown partially in phantom in FIG. 4.

As shown in FIG. 6, slots 22 are provided for air passage from the plenum to the center of the assembly. FIG. 5 shows a more detailed view of the vertical segmented stabilizing extension. The individual segments 12 of the extensions are characterized by having a pair of clamping tabs 13 for each element 12 of the vertical extension. Also there are provided a pair of fastener lugs 14 for each element of the assembly. Stabilizing slots 20 and stabilizing studs 21 ensure an even and smooth diameter change as the interconnected elements 12 are guided by the iris segments 6.

In operation, when its desired to change the diameter of the extruded tubing, the operator rotates handle 10 to either increase or decrease the size of the iris opening to accommodate the modified tube diameter. As hereinbefore described, handle 10 connects movable upper and lower cover plates 7. Accordingly, when rotating handle 10, upper and lower plates 7 will change their position relative to stationary ring 8. Simultaneously, iris segments 6 will move their position and increase or decrease the effective open diameter of the assembly. The opening and closing of iris segments 6 effect the overlapping relationship of vertical elements 12 in such a way that an increase in diameter will decrease the amount of overlapping, and a decrease in diameter will increase the amount of overlapping. Such adjustability of the stabilizing extension 12 will allow for desired variations in the advancing thermoplastic bubble diameter during production runs without requiring line shutdown for replacement of the cooling and stabilizing assembly, as required in the hereinbefore described prior art methods and apparatus.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A system for extruding tubular thermoplastic comprising:
    an extrusion die;

a cylindrical sleeve downstream from said die for receiving said tubular thermoplastic therethrough, said sleeve comprising a plurality of slidably interconnected arcuate plates;

a plurality of interconnected iris mechanisms spaced along the outer surface of said cylindrical sleeve, each of said iris mechanisms including a plurality of iris members, each of said iris members being connected to a respective one of said arcuate plates; and means for directing a cooling gas stream through said cylindrical sleeve to said tubular thermoplastic to provide a mantle of said cooling gas between the inner surface of said cylindrical sleeve and the outer surface of said tubular thermoplastic for cushioning, stabilizing and increasing the cooling period of said tubular thermoplastic advancing through said cylindrical sleeve;

whereby operation of said interconnected iris mechanisms changes the diameters of said cylindrical sleeve and said tubular thermoplastic.

2. The system of claim 1 wherein each of said iris mechanisms further includes an element having a plurality of slots; and wherein each of said iris members is elongated and has one end rigidly secured in said iris mechanism, has the other end slidably movable in a respective one of said slots and an intermediate portion connected to a respective one of said arcuate plates.

3. The system of claim 1 wherein said gas directing means comprises a source of gas, a plurality of perforations formed about said cylindrical sleeve, and means for conveying said gas from said gas source to said perforations.

4. The system of claim 2 wherein said gas directing means comprises a source of gas, a plurality of perforations formed about said cylindrical sleeve, and means for conveying said gas from said gas source to said perforations.

5. The system of claim 4 wherein said perforations are formed in each of said arcuate plates.

6. The system of claim 1 wherein there is provided two of said iris mechanisms, and wherein said gas directing means comprises a source of gas, a plurality of perforations formed in each of said arcuate plates about said cylindrical sleeve and between said iris mechanisms.

7. The system of claim 1 wherein said gas is air.

* * * * *